United States Patent [19]

Berg

[11] 4,126,553
[45] Nov. 21, 1978

[54] HYDRAULIC FILTER AND VALVE ARRANGEMENT

[75] Inventor: David A. Berg, Milwaukee, Wis.

[73] Assignee: Allis-Chalmers Corporation, Milwaukee, Wis.

[21] Appl. No.: 754,576

[22] Filed: Dec. 27, 1976

[51] Int. Cl.² .............................................. B01D 27/10
[52] U.S. Cl. ..................................... 210/130; 210/172
[58] Field of Search ............... 210/130, 168, 234, 235, 210/240, 172

[56] References Cited

U.S. PATENT DOCUMENTS

| 922,657 | 5/1909 | Worsey | 210/234 |
|---|---|---|---|
| 3,244,282 | 4/1966 | Rosaen | 210/234 X |
| 3,273,715 | 9/1966 | Rosaen | 210/234X |
| 3,283,907 | 11/1966 | Whiting | 210/234 |
| 3,333,697 | 8/1967 | Rosaen | 210/234 X |
| 3,368,679 | 2/1968 | Bozik | 210/234 X |
| 3,507,391 | 4/1970 | Rosaen | 210/234 X |
| 3,529,727 | 9/1970 | Bernhard | 210/234 |
| 3,628,662 | 12/1971 | Kudlaey | 210/234 X |
| 3,715,032 | 2/1973 | Niuto | 210/235 |
| 3,800,948 | 4/1974 | LaVallee | 210/234 X |

Primary Examiner—Theodore A. Granger
Attorney, Agent, or Firm—Arthur L. Nelson

[57] ABSTRACT

A hydraulic filter mounting arrangement with a sealing means on the filter element and a cover operated valve for closing off the hydraulic system from the chamber receiving the filter element when replacing the filter.

10 Claims, 4 Drawing Figures

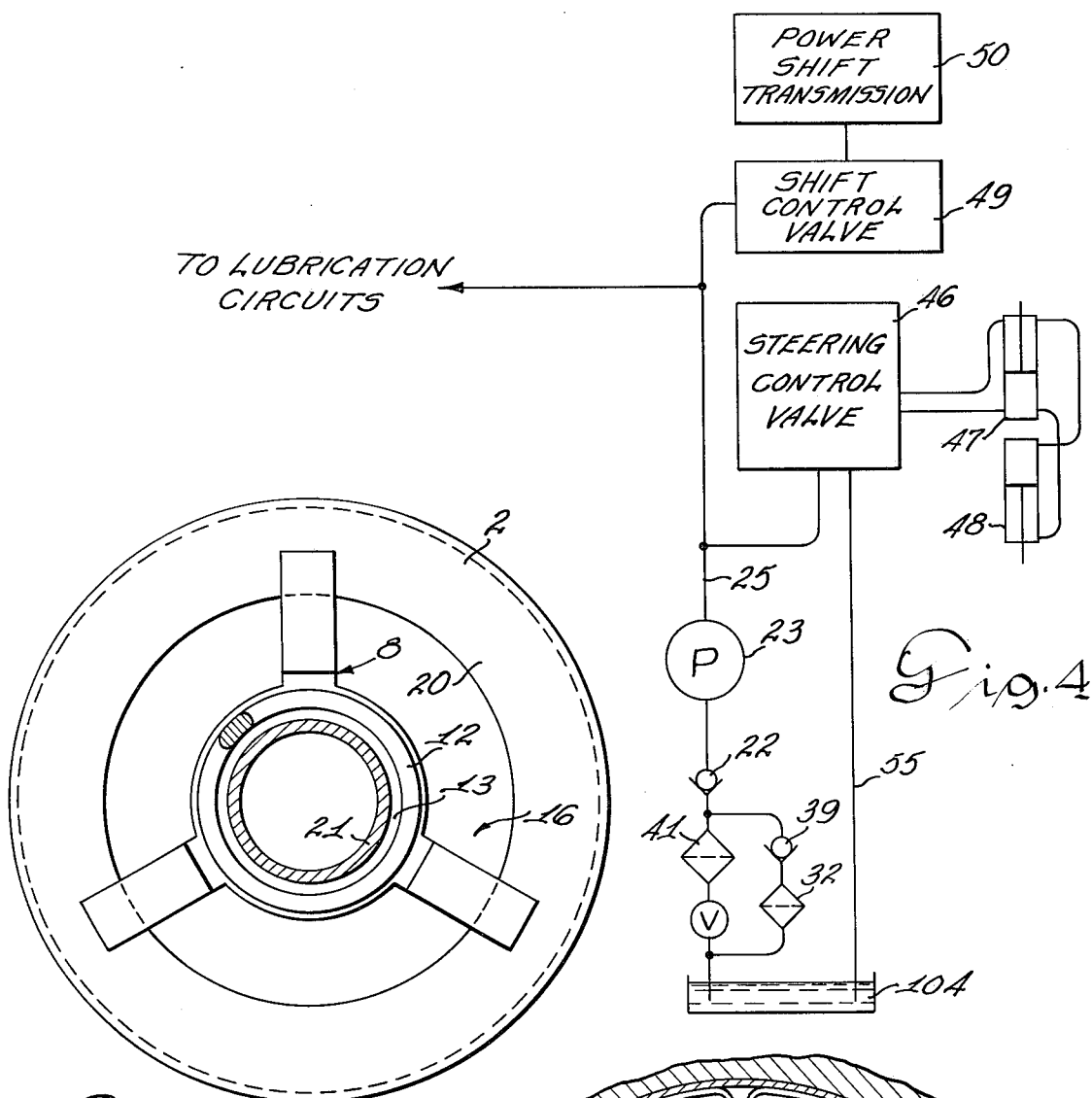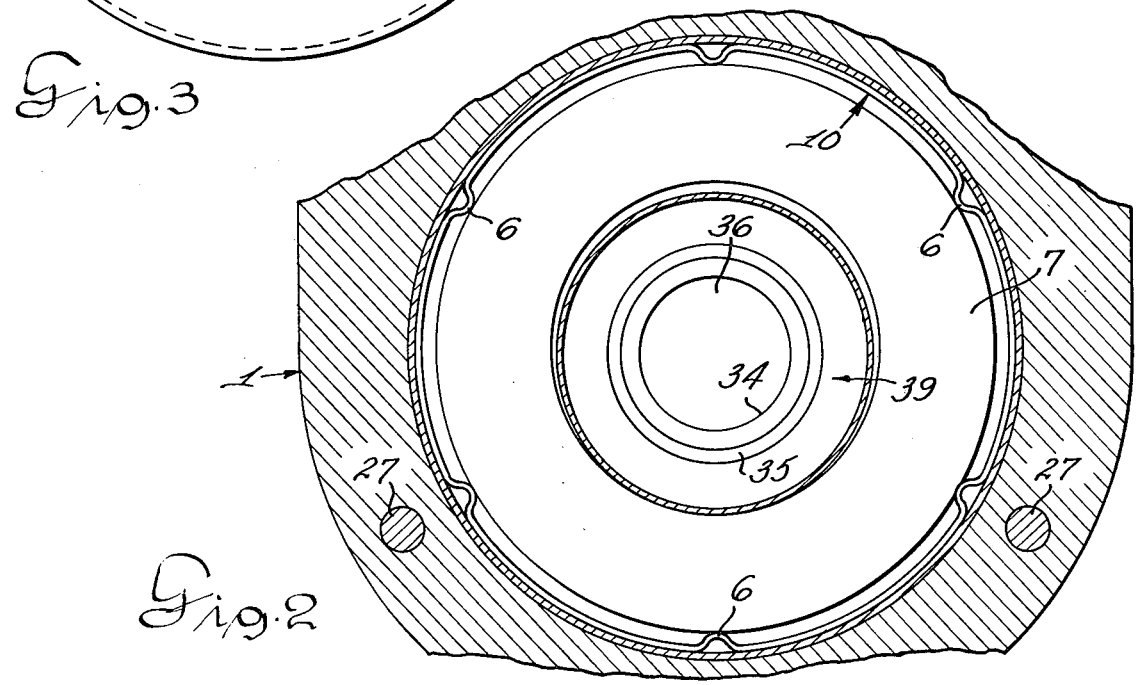

HYDRAULIC FILTER AND VALVE ARRANGEMENT

This invention relates to a filter in a hydraulic system and more particularly to a mounting and sealing means for a filter element and a valve operated by the cover for the chamber receiving the filter element to interrupt communication between the hydraulic system and the filter element chamber when the filter element is replaced.

Modern tractors commonly use hydraulic systems to operate auxiliary equipment. These hydraulic systems require a substantial amount of hydraulic fluid and it is imperative that cleanliness of the hydraulic fluid be maintained. Accordingly, frequent filter replacement is necessary to maintain the cleanliness of the hydraulic fluid. It may not, however, be advantageous to change the hydraulic fluid each time the filter is changed since the fluid in the hydraulic system does not really wear out, but primarily becomes contaminated or dirty and does not measure up to the cleanliness requirements of the hydraulic fluid in the system. It is particularly advantageous when large quantities of fluid are used in the hydraulic system that the fluid not unnecessarily be changed each time the filter is replaced since this may be an unnecessary expense. Accordingly, this invention provides for a valve arrangment and a sealing arrangement for interrupting communication between the hydraulic system and the filter element chamber when the filtering element is replaced, and, accordingly, there is no fluid loss from the system with the use of a filter sealing and mounting arrangement as set forth in this invention.

It is an object of this invention to provide a hydraulic filter arrangement in a hydraulic system.

It is another object of this invention to provide a filter element mounting and sealing means for interrupting communication between the filter element chamber and the hydraulic system when the filter element is changed.

It is a further object of this invention to provide a sealing arrangement and a valving arrangement for interrupting communication between the chamber for the filter element and the hydraulic system when the filter element is replaced.

The objects of this invention are accomplished by providing a filter chamber with a sealed reciprocating sleeve mounted in the housing forming a fluid receptacle with means for biasing the reciprocating sleeve outwardly in the housing. Inlet and outlet passage means are defined by the housing to and from the filter chamber. The outlet passage means is formed by a filter element seat which also forms a valve seat of the filter inlet valve. The valve element of the filter inlet valve is formed by the sleeve. The filter inlet valve is normally closed when the filter element is removed from the filter chamber. The cover for the filter chamber biases the sleeve to open the filter inlet valve when the cover is positioned over the opening for receiving the filter element. A resilient filter element retainer engages the cover and presses the filter element in sealing engagement with the filter seat and filter retainer to seal the filter element in the filter chamber. A filter bypass valve is formed in the filter retainer to bypass fluid if the filter element is defective. Accordingly, the filter can be replaced without loss of fluid or without replacing fluid in the hydraulic system.

The preferred embodiment of this invention is illustrated in the attached drawing.

FIG. 2 is a cross section view of the filter chamber taken on line II—II of FIG. 1;

FIG. 3 is a cross section view taken on line III—III of FIG. 1; and

FIG. 4 is a schematic illustration of the hydraulic circuit.

Figure 1:
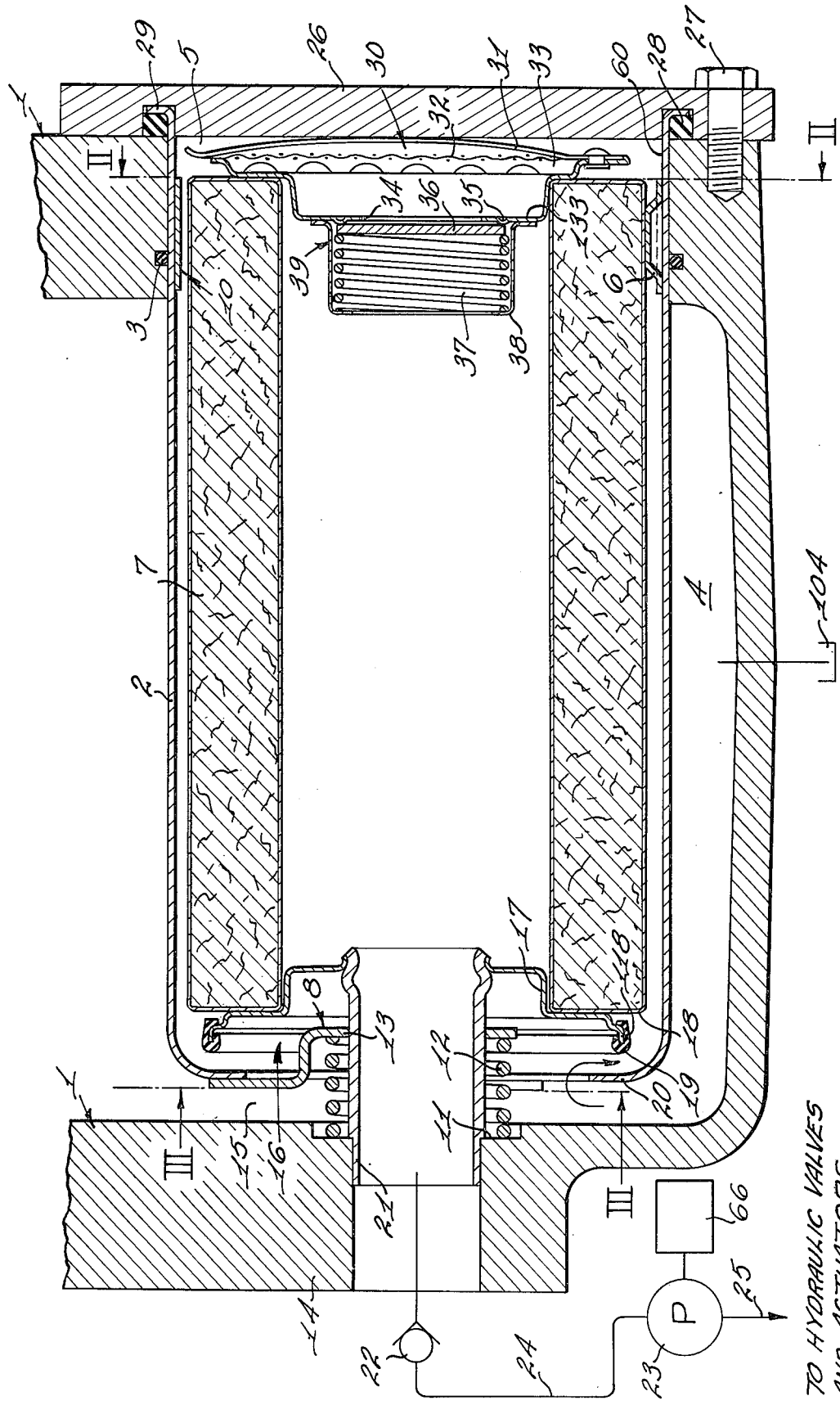
FIG. 1 illustrates a cross section view of the filter element mounting in the filter retaining sleeve.

Referring to the drawing, FIG. 1 illustrates a cross section view of a filter element in the filter chamber. The housing forms a fluid receptacle 1 reciprocally supporting the sleeve 2. The seal 3 seals the receptacle 1 with the sleeve 2 to seal the sump chamber 4 from the filter chamber 5. The band 10 is formed with the ridges 6 forming a means for aligning the filter element 7 when the element is received in the filter chamber 5. The spring seat 8 is firmly seated on the sleeve 2 by the biasing force of spring 12. The spring 12 is compressively positioned between the radial flange 13 of the spring seat 8 and the recess 11 of wall 14 of the receptacle 1. FIG. 3 shows an end view at the seat.

The sump chamber 4 is connected to the inlet passage 15 through the filter inlet valve 16 to the filter chamber 5. The filter element seat 17 forms a seal with the base 18 of the filter element 7. The filter element seat 17 is also formed with an axial flange 118 encased in a rubber lip forming the valve seat 19 for engagement with the radial flange 20 to form the valve 16 when the filter 7 is removed from the filter chamber 5.

The filter element seat 17 embraces the outlet conduit 21 which transmits hydraulic fluid through the check valve 22 to the pump 23 through conduit 24. The conduit 21 is fitted into the wall 14 of the receptacle 1. The pump 23 pressurizes fluid in the conduit 25 when the pump is in operation. The pump is normally driven by an engine 66.

The cover 26 is fastened by means of a plurality of bolts 27 of which one is shown and firmly seated against the square ring seal 28 in the cover 26. The end of the sleeve 2 forms a radial flange 29 in the cover 26 to form a seal assembly when the cover is loosened.

When the filter element 7 is positioned on the filter seat 17, the filter element retainer 30 engages the outer end of the filter element 7. As the cover presses against the sheet metal spring 31, the filter element retainer 30 and the filter element seat firmly seal both ends of the filter element 7.

A screen 32 is mounted on the annulus 33. The recessed center portion 133 of the filter element retainer is formed with opening 34 and an annular ridge 35. Pressurized fluid can flow through the opening 34 and unseat the valve element 36 against the biasing force of the spring 37 mounted in the cup 38. The bypass valve 39 operates as a safety feature to assure a hydraulic fluid supply to the pump 23 even though the filtering element may become clogged.

FIG. 2 illustrates the plurality of ridges 6 angularly spaced in the band 10 for aligning the filtering element in the operating position within the filter chamber 5.

Referring to FIG. 4, the pump 23 draws hydraulic fluid through the check valve 22 and the filter assembly 41 to provide a quiet area for the pump inlet with a minimum of entrained air. Inlet passage means 15 is connected through the filter inlet valve 16 to the sump 104. The pump 23 pressurizes fluid in the conduit 25 and supplies pressurized fluid to the steering control valve and steering cylinders 47 and 48. Similarly, the pressurized fluid in the conduit 25 is supplied to the shift control valve 49 and power shift transmission 50. The hydraulic fluid in the conduit 25 also operates lubrication circuits. Other additional auxiliary equipment may be provided in the hydraulic system not shown in this application.

The hydraulic fluid in the draft control system is returned through the conduit 55 to the sump 104.

The operation of the hydraulic filter and valve arrangement will be described in the following paragraphs.

The filter element 7 is shown in the operating position in FIG. 1. When it is desired to replace the filter element, a plurality of bolts 27, of which one is shown, are removed from the end plate 26. The end plate 26 can then be removed and the spring 12 biases the sleeve 2 axially to the right until the radial flange 20 engages the valve seat 19 thereby closing the valve 16 and interrupting communication between the sump chamber 4 and the valve chamber 5. The check valve 22 is normally spring biased to a closed position when the pump is not drawing fluid from the outlet passage 21. It is preferable that the filter chamber be positioned in a vertical position so that no fluid runs from the filter chamber when the cover is removed. It is, however, satisfactory to operate the filtering arrangement whereby the filter chamber 5 lies in a horizontal plane although the fluid in the filter chamber drains from the chamber when the filter element is removed. The remaining portion of the hydraulic system is closed off from the filter chamber. This permits the removal of the filter element without losing hydraulic fluid of the system. The filter element can be replaced by withdrawing the filter element retainer 33 from the filter chamber 5 and replaced with a new filter element for filtering of the hydraulic fluid. The filter element retainer 30 is reinserted in the end of the filter element 7 and the cover 26 replaced on the end of the opening 60 as shown. The seal 28 seals the end of the chamber when the cover is placed on the end of the opening 60. The resilience of the spring 31 firmly seats the spring retainer 30 and the filter element seat 17 to firmly seal both ends of the filter element 7 in its operating position.

When the cover 26 engages the sleeve 2, it biases in the left-hand direction to open the valve 16 to permit fluid flow from the sump 104 through the filter element 7 through the conduit 21 for operation of the filtering of hydraulic fluid in the system.

The bypass valve 39 is normally in the closed position. When the filter element 7, however, is clogged, there is a provision for fluid flow through the bypass valve 39 to assure fluid supply to the pump 23 at all times regardless of whether the filter is defective or not.

Accordingly, it can be seen that the filter can be replaced without changing the fluid. The fluid lost in the filter change is minimal and accordingly the filter can be frequently changed to assure cleanliness of the hydraulic fluid in the system.

The embodiments of the invention in which an exclusive property or privilege is claimed are defined as follows:

1. A filter mounting and sealing arrangement in a hyraulic system comprising, a filter chamber with an outlet passage means therefrom located within a receptacle for hydraulic fluid, a sleeve extending from the surface of said receptacle into said fluid receptacle defining the filter chamber with an opening therein, a filter element located within said sleeve, said sleeve reciprocally mounted in said receptacle and defining a filter inlet valve element, resilient means biasing said sleeve axially outwardly, a filter element seat in said filter chamber mounted around said outlet passage means for seating said filter element, a filter inlet valve seat on said filter element seat forming a filter inlet valve with said sleeve for interrupting communication from said receptacle to said filter chamber when said filter element is removed, a cover engaging the end of said sleeve located at the surface of said receptacle for closing said opening and biasing said filter inlet valve to an open position when said cover closes said opening in the filter operating position, a resilient filter element retainer engaging said cover and pressing said filter element in sealing engagement with said filter element seat and said filter element retainer when said cover closes said opening.

2. A filter mounting and sealing arrangement in a hydraulic system as set forth in claim 1 wherein said filter inlet valve seat defines a deformable element for forming a sealing surface in said filter inlet valve interrupting communication between said receptacle and said filter chamber.

3. A filter mounting and sealing arrangement in a hydraulic system as set forth in claim 1 including a check valve in said filter element retainer for bypassing hydraulic fluid around said filter element when said filter element is clogged.

4. A filter mounting and sealing arrangement in a hydraulic system as set forth in claim 1 wherein said filter chamber defines a cylindrical chamber for receiving a cylindrical filter element.

5. A filter mounting and sealing arrangement in a hydraulic system as set forth in claim 1 including a check valve in said outlet passage means.

6. A filter mounting and sealing arrangement in a hydraulic system as set forth in claim 1 including a plurality of ridges angularly spaced around said sleeve to provide aligning means for centrally aligning said filter element for reception within said filter chamber.

7. A filter mounting and sealing arrangement in a hydraulic system as set forth in claim 1 wherein said filter element defines a cylindrical filter, means mounting said bypass valve centrally within said filter element for bypassing fluid around said filter.

8. A filter mounting and sealing arrangement in a hydraulic system as set forth in claim 1 wherein said filter element defines a sleeve with a center opening, said filter retainer defines an annular recess for receiving said filter element, a cap centrally extending into said center opening of said filter element and including a bypass valve supporting means for extending within the central opening of said filter element.

9. A filter mounting and sealing arrangement in a hydraulic system as set forth in claim 1 wherein a spring seat and a spring define said resilient means.

10. A filter mounting and sealing arrangement in a hydraulic system as set forth in claim 1 wherein said outlet passage means defines a central passage extending through said receptacle, means adapted for connecting said outlet passage means to a pump to provide suction through said filter when said filter is in the operating position.

* * * * *